United States Patent
Nakamura et al.

(10) Patent No.: US 6,801,967 B2
(45) Date of Patent: Oct. 5, 2004

(54) WIRELESS MOUSE UNIT, WIRELESS MOUSE AND RECEIVER

(75) Inventors: Shuji Nakamura, Shinagawa (JP); Tamotsu Koike, Shinagawa (JP); Kazuhiro Watanabe, Shinagawa (JP)

(73) Assignee: Fujitsu Takamisawa Component Ltd., Tokyo (JP)

( * ) Notice: Subject to any disclaimer, the term of this patent is extended or adjusted under 35 U.S.C. 154(b) by 293 days.

(21) Appl. No.: 09/866,648

(22) Filed: May 30, 2001

(65) Prior Publication Data

US 2002/0061739 A1 May 23, 2002

(30) Foreign Application Priority Data

Nov. 17, 2000 (JP) ........................................ 2000-351459

(51) Int. Cl.[7] .............................................. G06F 13/14
(52) U.S. Cl. ........................ 710/62; 345/163; 345/168; 345/180
(58) Field of Search ............................ 710/62; 345/168, 345/163, 180

(56) References Cited

U.S. PATENT DOCUMENTS

| | | | | |
|---|---|---|---|---|
| 5,945,981 A | * | 8/1999 | Paull et al. ................. | 345/180 |
| 6,211,861 B1 | * | 4/2001 | Rosenberg et al. .......... | 345/163 |
| 6,219,037 B1 | * | 4/2001 | Lee ............................. | 345/167 |
| 6,255,800 B1 | * | 7/2001 | Bork .......................... | 320/115 |
| 6,304,250 B1 | * | 10/2001 | Yang et al. .................. | 345/168 |
| 6,392,671 B1 | * | 5/2002 | Glaser ........................ | 345/765 |
| 6,476,795 B1 | * | 11/2002 | Derocher et al. ........... | 345/163 |

FOREIGN PATENT DOCUMENTS

| | | | |
|---|---|---|---|
| JP | 410301708 A | * | 11/1998 |
| JP | 411110130 A | * | 4/1999 |

* cited by examiner

*Primary Examiner*—A. Elamin
(74) *Attorney, Agent, or Firm*—Staas & Halsey LLP

(57) ABSTRACT

A wireless mouse unit has a wireless mouse generating signals for moving a cursor across a display screen, a rechargeable secondary battery cell built into the wireless mouse, and a receiver for receiving the signals transmitted from the wireless mouse, the receiver electrically connected to and powered by a computer via a cable. The receiver includes a charging terminal for recharging the rechargeable battery when the wireless mouse is placed in the receiver, eliminating the need for a special charger to recharge the rechargeable secondary battery cell built into the wireless mouse.

10 Claims, 14 Drawing Sheets

WIRELESS MOUSE UNIT, WIRELESS MOUSE AND RECEIVER

BACKGROUND OF THE INVENTION

1. Field of the Invention

The present invention relates to an improved wireless mouse unit, wireless mouse and receiver, and more particularly, to an improved wireless mouse unit, wireless mouse and receiver used in the wireless transmission of information that moves a display cursor over a display screen.

2. Description of the Related Art

Generally, the wireless mouse has the advantage of eliminating the inconvenience posed by connecting cables, although this advantage is offset by the need for the mouse itself to have a built-in power source, typically either a dry cell or a rechargeable secondary battery cell.

Moreover, in addition to the standard mouse arrangement, with a ball cage located inside a housing which has a belly door on a bottom surface thereof that allows the ball to contact the working surface (typically a mouse pad), mice equipped with optical sensors have recently been introduced. The advantage of the latter arrangement is that the optical sensor does not contact any working surface and thus does not have the disadvantage posed by the former, in which the ball acquires dirt and dust and must be subjected to periodic maintenance. On the other hand, such optical sensor-equipped mice do have the disadvantage of relatively heavy power consumption, which means that the dry cell batteries must be replaced frequently. For this reason a wireless mouse powered by a secondary battery cell becomes desirable. In this case, too, the heavy power consumption necessitates some easy means of recharging the secondary battery cell.

Wireless mice powered by a conventional secondary battery cell come equipped with a special battery charger as an accessory, the battery charger being used to charge the secondary battery cell. Accordingly, the conventional wireless mouse unit has a charger in addition to a wireless mouse and a receiver.

However, the problem with such a configuration is that it makes the whole arrangement bulky, hard to use and expensive.

Additionally, the conventional wireless mouse cannot be connected by a cable to the main unit, so when the battery is depleted the mouse cannot be used and neither can the computer.

BRIEF SUMMARY OF THE INVENTION

Accordingly, it is an object of the present invention to provide an improved and useful wireless mouse unit, wireless mouse and receiver, in which the above-described disadvantage is eliminated.

The above-described object of the present invention is achieved by a wireless mouse unit comprising:

a wireless mouse generating signals for moving a cursor across a display screen;

a rechargeable secondary battery cell included in the wireless mouse; and a receiver for receiving the signals transmitted from the wireless mouse, the receiver electrically connected to and powered by a computer via a cable, the receiver including charging terminals for recharging the rechargeable secondary battery cell of the wireless mouse.

The above-described object of the present invention is also achieved by the wireless mouse unit substantially as described above, wherein the receiver includes a wireless mouse cradle shaped to accommodate the wireless mouse when the wireless mouse is set thereat when the wireless mouse is not in use, the charging terminals disposed so as to contact charging terminals provided on the wireless mouse when the wireless mouse is set at the wireless mouse cradle so as to allow charging of the rechargeable secondary battery cell.

According to these aspects of the invention, providing a charging terminal on the receiver eliminates the need for a special charger for the purpose of recharging the rechargeable battery of the wireless mouse. Additionally, after usage the wireless mouse can be set in the receiver portion of the wireless mouse unit and the secondary battery cell built into the wireless mouse can be charged in the meanwhile, so the wireless mouse can be readied for use with an adequate charge.

The above-described object of the present invention is also achieved by the wireless mouse substantially as described above, the wireless mouse unit further comprising a connector cable having at one end thereof a USB connector for connecting to a USB connector located on the computer and a second connector at another end thereof, wherein:

the receiver further comprises a connector for connecting to the second connector of the connector cable;

the wireless mouse further comprises:

a wireless mouse connector for connecting to the second connector of the connector cable; and a USB microcontroller unit powered by power supplied from the computer via the wireless mouse connector; and a battery charger for charging the rechargeable secondary battery cell of the wireless mouse using electric power supplied from the computer via the cable when the wireless mouse is not in use, the battery charger being powered by power supplied from the computer via the wireless mouse connector.

According to these aspects of the invention, the wireless mouse can also be used in a wired state because the wireless mouse can be connected to the computer and powered by the computer, which is convenient in case the operator forgets to charge the secondary battery cell. Additionally, the wireless mouse secondary battery cell can be charged while the wireless mouse is being used as a wired mouse.

The above-described object of the present invention is also achieved by the wireless mouse substantially as described above, with the addition of a solar battery cell provided on an upper surface of a body of the wireless mouse, the solar battery cell being electrically connected in parallel with the rechargeable secondary battery cell of the wireless mouse.

According to this aspect of the invention, inclusion of a solar battery cell in the wireless mouse connected in parallel to the secondary battery cell of the wireless mouse allows the electricity generated by the solar battery cell to be used either to power the wireless mouse or to charge the secondary battery cell, thus reducing consumptive wear on the rechargeable secondary battery cell and extending its working life.

BRIEF DESCRIPTION OF THE DRAWINGS

These and other objects, features, aspects and advantages of the present invention will become better understood and more apparent from the following description, appended claims and accompanying drawings, in which:

DETAILED DESCRIPTION OF THE INVENTION

A description will now be given of embodiments of the present invention, with reference to the accompanying drawings. It should be noted that identical or corresponding elements in the embodiments are given identical or corresponding reference numbers in all drawings, with detailed descriptions of such elements given once and thereafter omitted.

Figure 1:
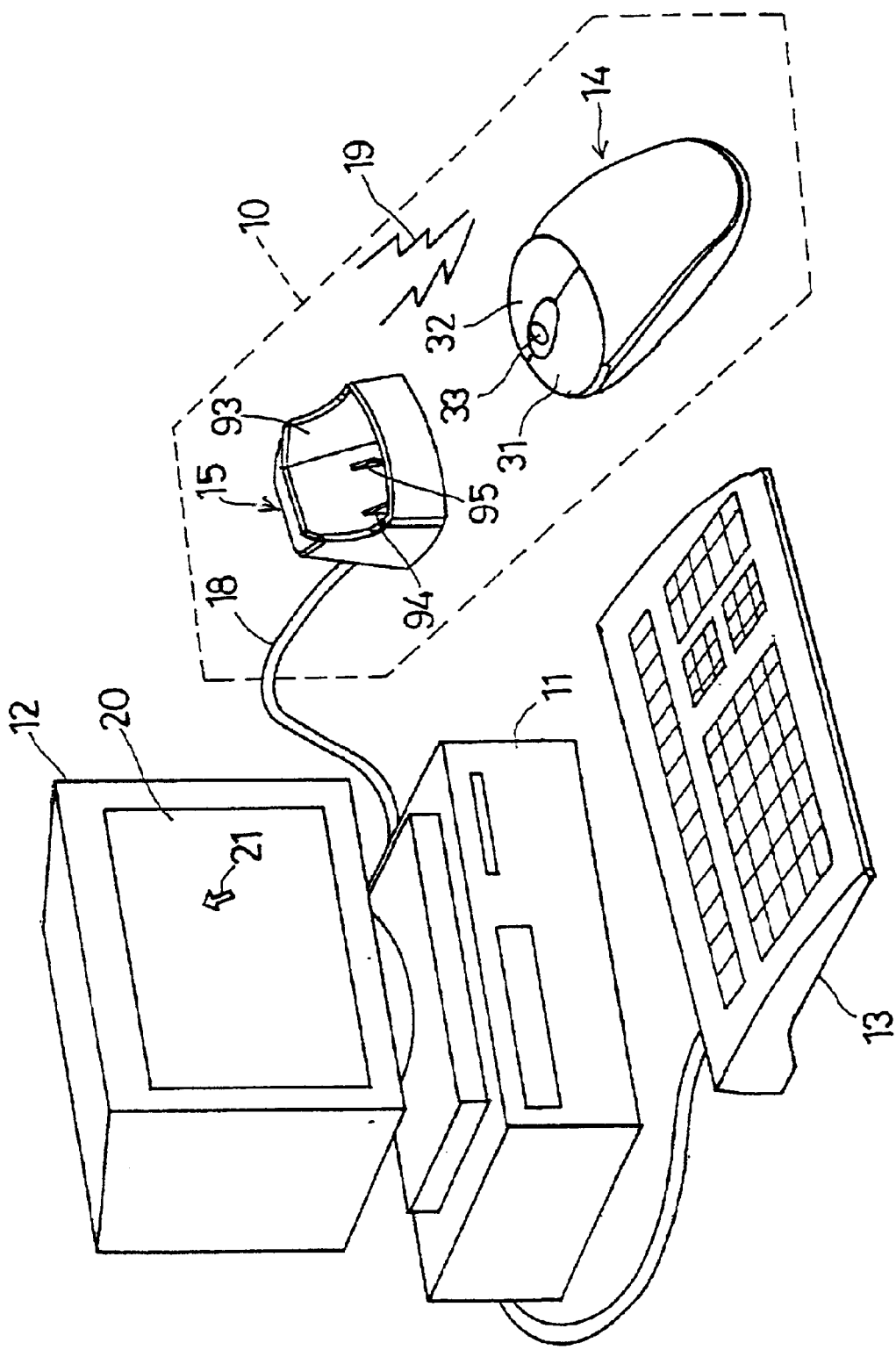
FIG. 1 shows a wireless mouse unit according to one embodiment of the present invention, in a state of normal operation.

FIG. 1 shows a wireless mouse unit 10 according to one embodiment of the present invention, in a state of normal operation.

Figure 7:
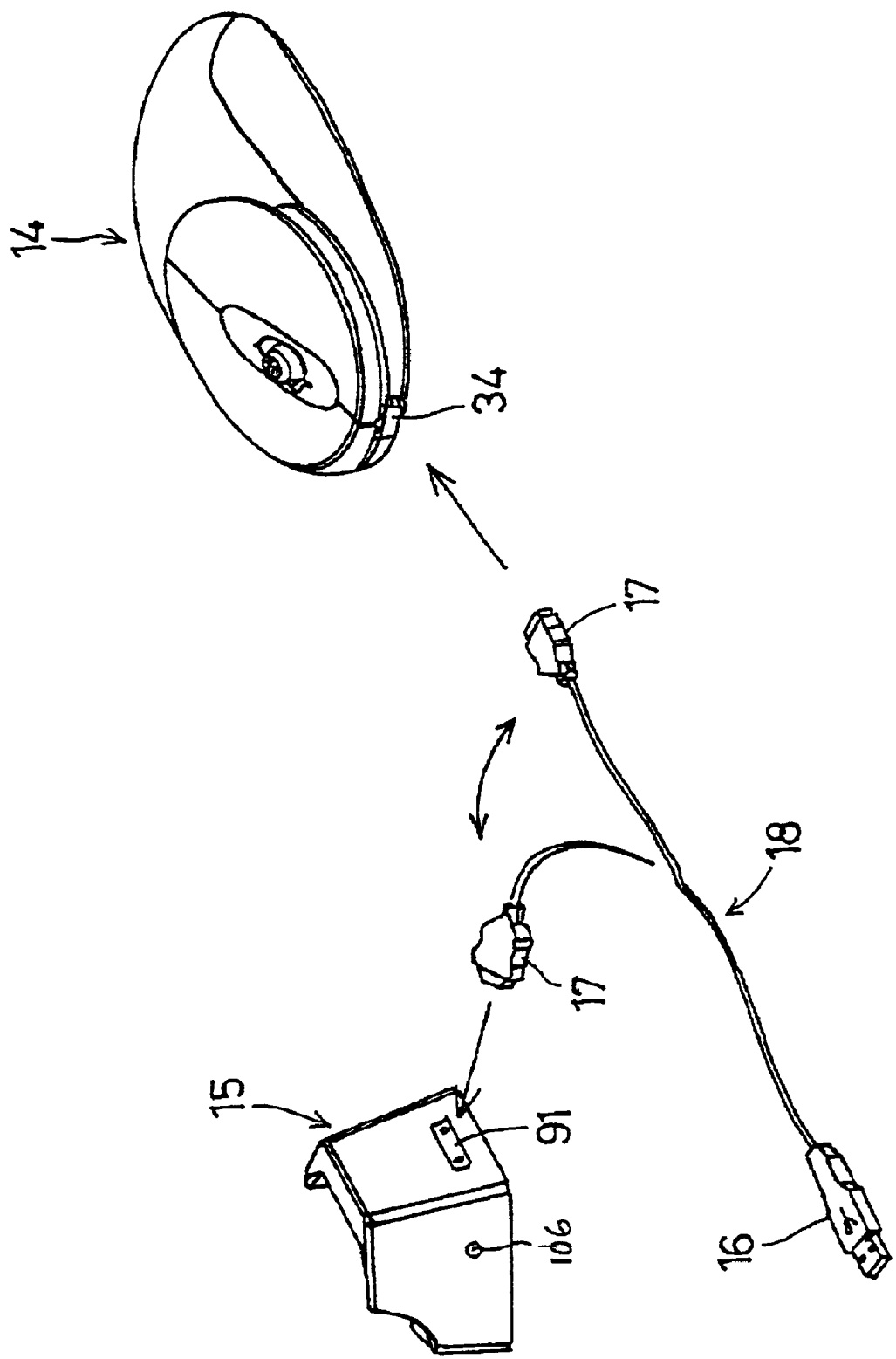
FIG. 7 is a perspective view of the connector cable in relation to the wireless mouse and the adapter.

As shown in the diagram, reference numeral 11 indicates a computer main unit, 12 is a CRT monitor and 13 is the keyboard. Reference numeral 14 is the wireless mouse and 15 is the receiver. The receiver 15 is connected to the computer main unit 11 via a connector cable 18 that has a USB male connector 16 at one end and a connector 17 at the other as shown in FIG. 7.

Moving the wireless mouse 14 causes a radio signal 19 to be transmitted, which is received by the receiver 15. Moving the wireless mouse 14, operates an optical sensor unit 36 to be described later and a cursor 21 is moved about to a given position on a display screen 20 of the CRT monitor 12. Input can be carried out by pressing and clicking a button 31 or 32.

Together, the wireless mouse 14, receiver 15 and connector cable 18 form a wireless mouse unit 10. There is no specialized charger.

A description will now be given of the wireless mouse 14.

Figure 2A:
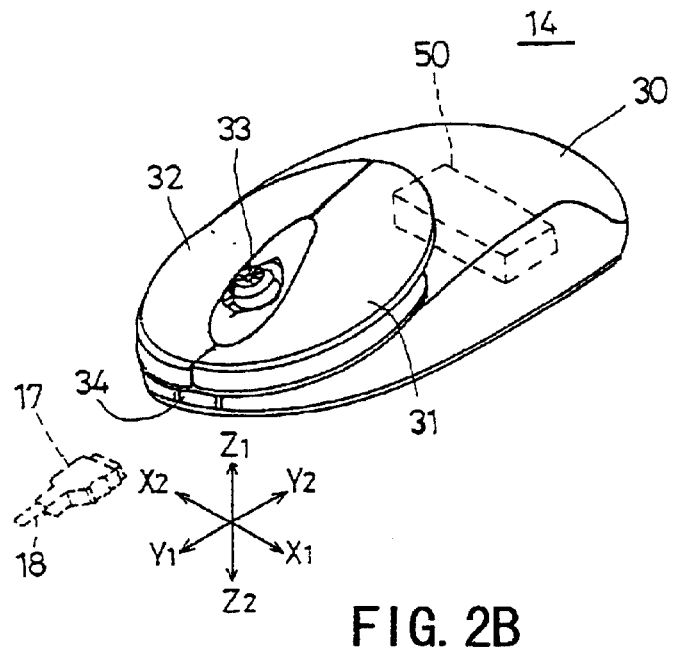
FIGS. 2A and 2B show front perspective views of a mouse and back perspective views of a mouse in relation to a receiver, respectively.
Figure 2B:
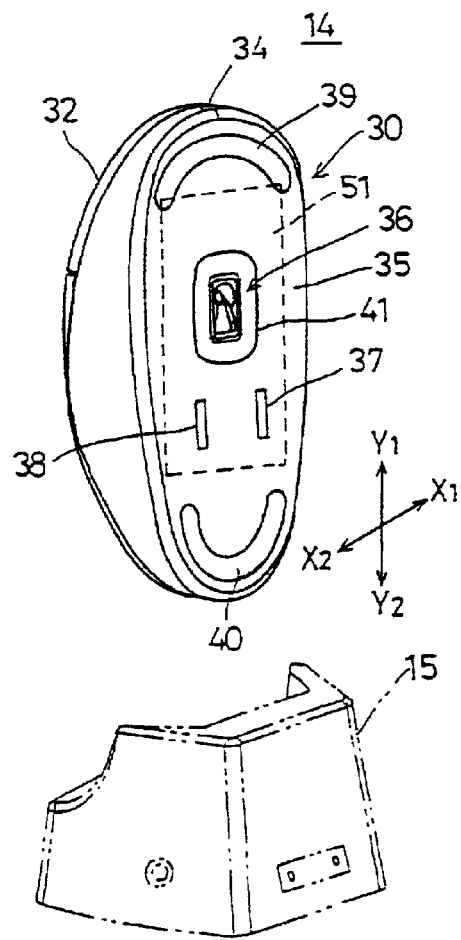

FIGS. 2A and 2B show front perspective views of a mouse and back perspective views of a mouse in relation to a receiver, respectively.

For convenience of illustration, the Y1-Y2 axis represents depth in a longitudinal direction, the X1-X2 axis represents width and the Z1-Z2 axis represents height. The wireless mouse 14 comprises a substantially oval-shaped body 30 with the longer axis in the Y1-Y2 direction when viewed from above, a plurality of operating buttons disposed at an upper front end, that is the Y1 end, of the body 30, a female connector 34 exposed at the front tip of the body 30, an optical sensor unit 36 exposed at a center of a bottom surface 35 of the main unit 30, and two substantially oblong charging terminals 37, 38 located to the rear of the optical sensor unit 36 toward the Y2 end of the body 30, aligned so as to be parallel to each other. In addition, the bottom surface 35 also contain spacer convexities 39 and 40 positioned at the Y1 and Y2 ends of the body 30 as well as another spacer convexity 41 formed around the periphery of the optical sensor unit 36.

The charging terminals 37 and 38 correspond to the charging terminals 94, 95 of the receiver 15. The female connector 34 accommodates the male connector 17.

Inside the body 30 of the mouse are the optical sensor unit 36, a secondary battery cell 50, and a printed circuit board module 51 that includes a charging circuit.

Figure 3:
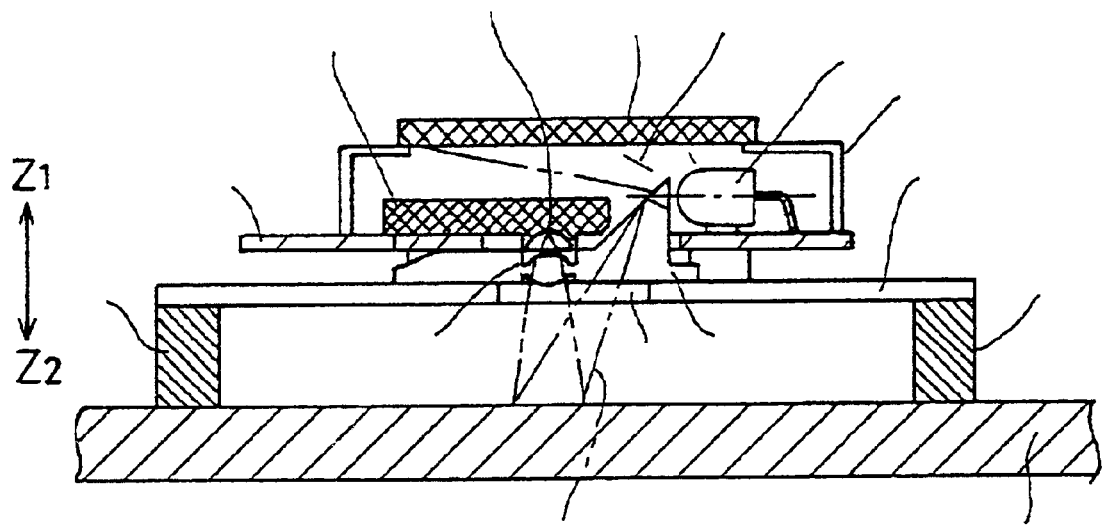
FIG. 3 is a diagram showing the optical sensor device built into the wireless mouse.

FIG. 3 is a diagram showing the optical sensor device built into the wireless mouse. The optical sensor unit 36 has a printed circuit board 60, an LED 61 mounted sideways, an optical sensor chip 62, a prism 63 and a lens 64. The light emitted from the LED 61, as indicated by the reference numeral 65a, is reflected by the prism 63, passes through a opening 35a in the bottom surface 35 of the main unit 30, is reflected back by the surface of a working surface 65, passes once again through the opening 35a and is focussed by the lens 64 onto an optical sensor part composed of a CCD 62a in an optical sensor chip 62. The optical sensor part 62a reads the condition of the surface of the working surface 65, compares that reading to a previous reading and, based on the result of that comparison, outputs a signal corresponding to the direction and distance of movement of the wireless mouse 14.

Reference numeral 66 is a solar battery, fixed to a bracket 67, supported by the printed circuit board 60 and disposed horizontally above the LED 61. When the LED 61 emits light, the solar battery cell 66 collects the light 65b that slants upward when emitted from the LED 61, generating and outputting power. The power so generated and output is used to power a wireless mouse microcontroller unit 70 and a data transmission module 71 both to be described later, with the solar battery cell 66 functioning as an auxiliary power supply for the secondary battery cell 50. Additionally, the power from the solar battery cell 66 is also used to charge the secondary battery cell 50.

Figure 4:
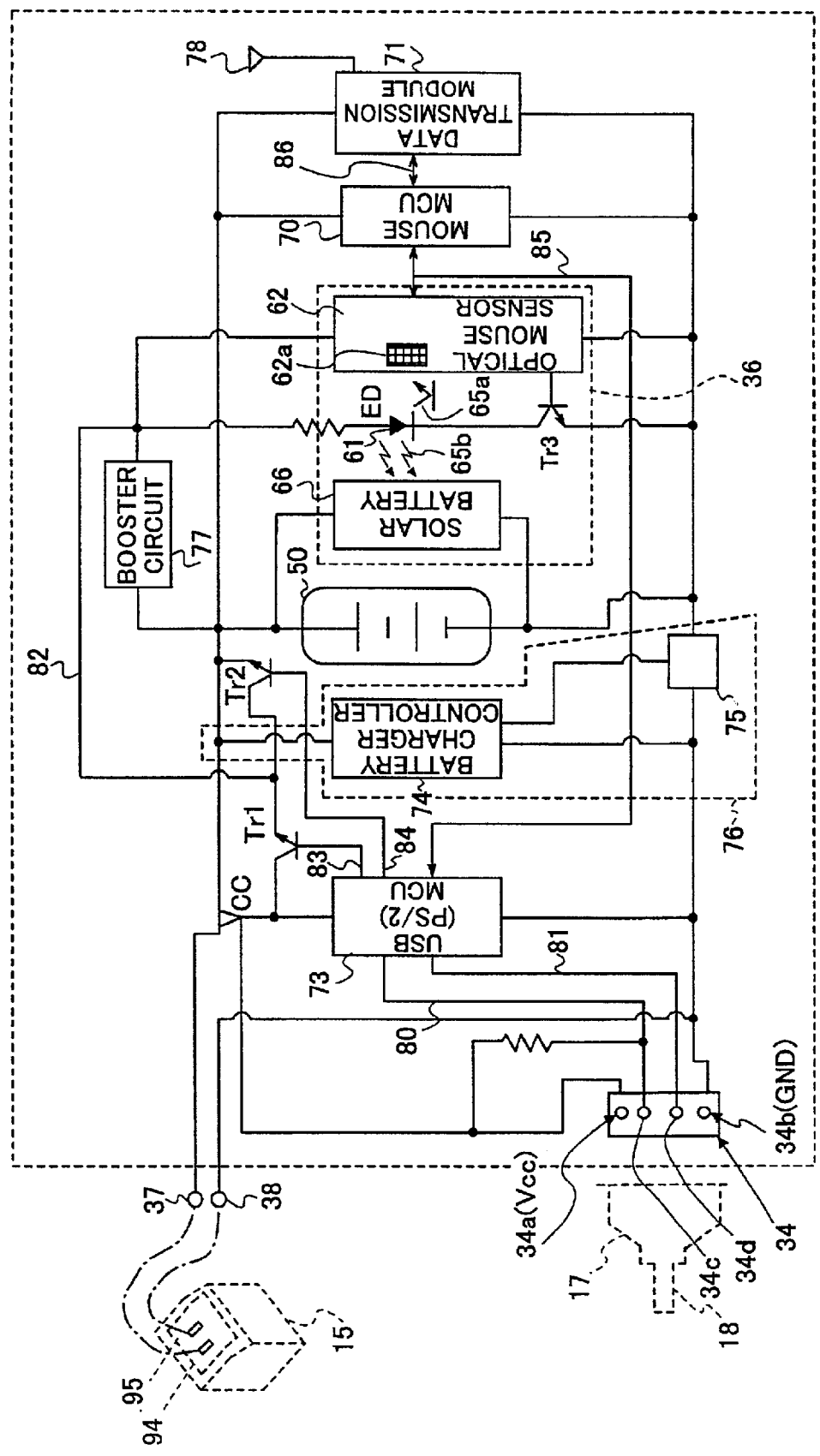
FIG. 4 is a circuit diagram of the wireless mouse shown in FIGS. 2A and 2B.

FIG. 4 is a circuit diagram of the wireless mouse 14 shown in FIGS. 2A and 2B, composed chiefly of the printed circuit board module 51.

The wireless mouse 14 includes, in addition to the secondary battery cell 50 and the optical sensor unit 36, the wireless mouse microcontroller unit 70, the data transmission module 71, a USB (Universal Serial Bus) microcontroller unit 73, a secondary battery cell charger controller 74, an overcharge prevention switch circuit 75, a booster circuit 77, transistors Tr1, Tr2 and so forth.

The secondary battery cell 50, the optical sensor unit 36, the wireless mouse microcontroller unit 70, the data transmission module 71, the USB microcontroller unit 73 and the secondary battery cell charger controller 74 are connected in parallel. The booster circuit 77 is connected to the input side of the LED 61.

The supply voltage Vcc is 4.4 to 5.25 volts. The rated voltage of the secondary battery cell 50 is 3.2 to 3.6 volts. The voltage across the charging terminals 94, 95 of the receiver 15 is 4.4 volts.

The female connector 34 comprises a supply voltage Vcc terminal 34a, a GND terminal 34b, and data terminals 34c, 34d.

The wireless mouse microcontroller unit 70 is a so-called mouse microprocessor, and is connected via busses 85, 86 to the optical sensor unit 36, the data transmission module 71 and the USB microcontroller unit 73. The USB microcontroller unit 73 is a so-called USB microprocessor, and is connected via the bus 85 to the optical sensor unit 36 and the wireless mouse microcontroller unit 70.

The wireless mouse microcontroller unit 70 has an operating voltage of approximately 3.2 to 3.6 volts, is operated by the secondary battery cell 50, and controls the wireless mouse 14 when the wireless mouse 14 is used as a wireless mouse, for example by processing the signals corresponding to the direction and distance of movement of the wireless mouse 14 sent by the optical sensor unit 36 and sending these processed signals onward to the data transmission module 71.

The data transmission module 71 emits from an antenna 78 radio signals that move the cursor 21 across the display screen 20.

The USB microcontroller unit 73 has an operating voltage of 4.4 to 5.25 volts, is operated by a supply voltage Vcc supplied from the computer main unit 11 via the connector cable 18, and controls the operation of the wireless mouse 14 when the wireless mouse 14 is connected to the connector cable 18 from the computer main unit 11 and used as a wired mouse, for example by processing the signals corresponding to the direction and distance of movement of the wireless mouse 14 sent by the optical sensor unit 36, processing these signals into signals that move the cursor across the display screen 20, and outputting the processed signals to the data lines 80, 81. Additionally, the microcontroller unit 73 outputs a signal to line 83, turning Tr1 ON. Accordingly, the supply voltage Vcc is applied to the LED 61 and the optical sensor chip 62 via a line 82 that detours around the booster circuit 77. Additionally, the microcontroller unit 73 outputs a signal to line 84, turns Tr2 ON, causing the supply voltage Vcc to Be applied to the secondary battery cell charger controller 74, the wireless mouse microcontroller unit 70 and the data transmission unit 71. Additionally, when the microcontroller unit 73 detects that the interface is a PS/2, it automatically switches from a USB operating state to a PS/2 operating state.

The secondary battery cell charger controller 74 is connected in parallel to the secondary battery cell 50 and monitors the voltage of the secondary battery cell 50. When the wireless mouse 14 is left atop the working surface and there is no change in either the data from the optical sensor unit 36 or the output from the operation of the operating buttons 31, 32 and 33, the secondary battery cell charger controller 74 charges the secondary battery cell 50 and, when the secondary battery cell 50 has been fully charged, opens an overcharge prevention switch circuit 75. The overcharge prevention switch circuit 75 is connected in series to the secondary battery cell 50, at a point between the secondary battery cell 50 and the ground. The secondary battery cell charger controller 74 and the overcharge prevention switch circuit 75 together form the charge circuit 76. When the overcharge prevention switch circuit 75 is opened, the charge circuit 76 is OFF.

The booster circuit 77 is disposed between the secondary battery cell 50 on the one hand and the LED 61 and optical sensor chip 62. The LED 61 and optical sensor chip 62 cannot always be driven at the output voltage of the secondary battery cell 50, so the output voltage of the secondary battery cell 50 is boosted by the booster circuit 77 and applied to the LED 61 and the optical sensor chip 62.

A description will now be given of the receiver 15, with reference to the accompanying drawings.

Figure 5A:
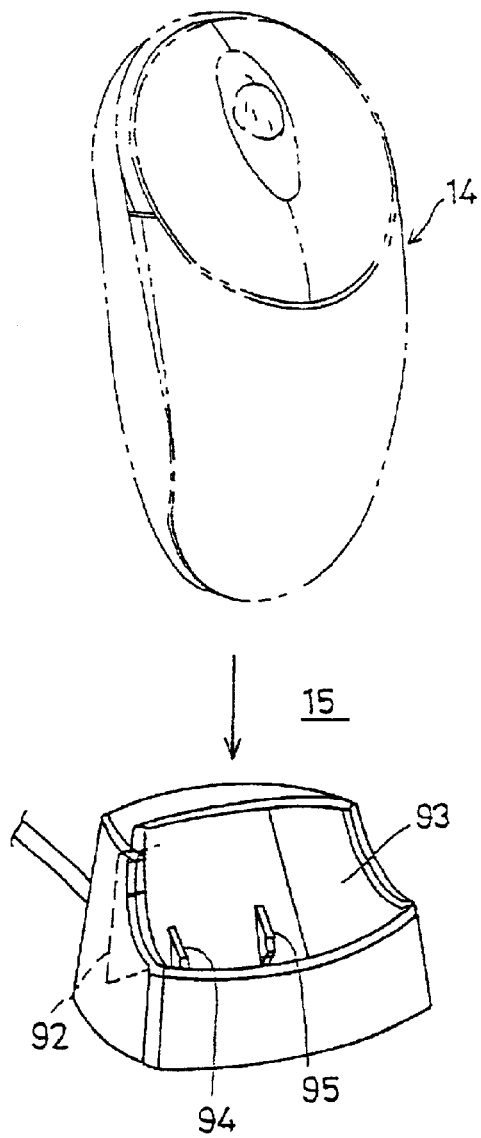
FIGS. 5A, 5B and 5C show a front perspective view of the receiver in relation to the wireless mouse, a rear perspective view of the receiver in relation to the wireless mouse, and a perspective view of an AC adapter used with the receiver, respectively.
Figure 5B:
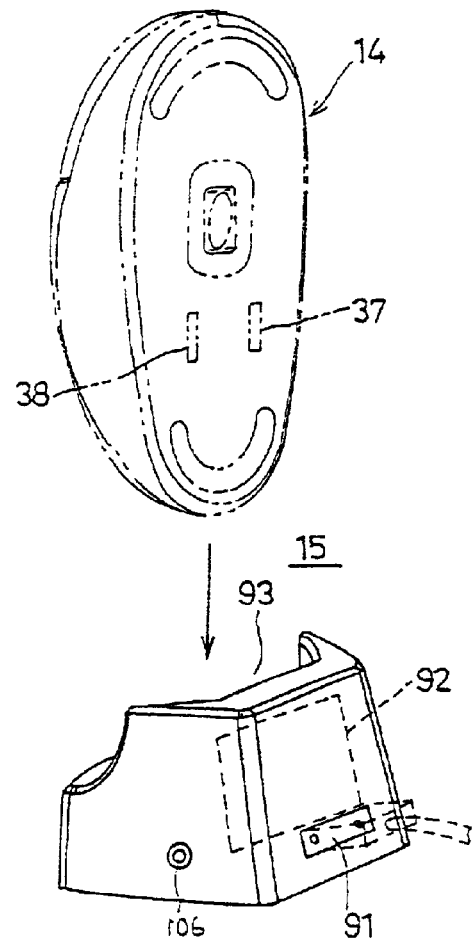
Figure 5C:
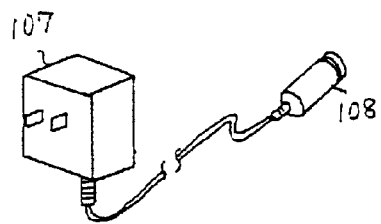

FIGS. 5A, 5B and 5C show a front perspective view of the wireless mouse in relation to the receiver, a rear perspective view of the wireless mouse in relation to the receiver, and a perspective view of an AC adapter used with the receiver, respectively.

As shown in the diagrams, the receiver 15 is substantially a cube, housing within it an reception antenna 90 (see FIG. 6), a female connector 91 and a printed circuit board module 92. The receiver 15 has a concave wireless mouse holder 93 on the front, shaped so as to accommodate the wireless mouse 14 and support the wireless mouse 14 in an upright vertical position when the wireless mouse is not in use. The wireless mouse holder 93 is provided with the pair of exposed charging terminals 94, 95 described above, disposed at positions corresponding to the charging terminals 37, 38 of the wireless mouse 14.

Additionally, an AC adapter connection terminal 106 is provided on a lateral surface of the receiver 15. A connector 108 located at a tip of a cable extending from an AC adapter 107 plugged into an ordinary commercial power outlet is connected to the AC adapter connection terminal 106.

Figure 6:
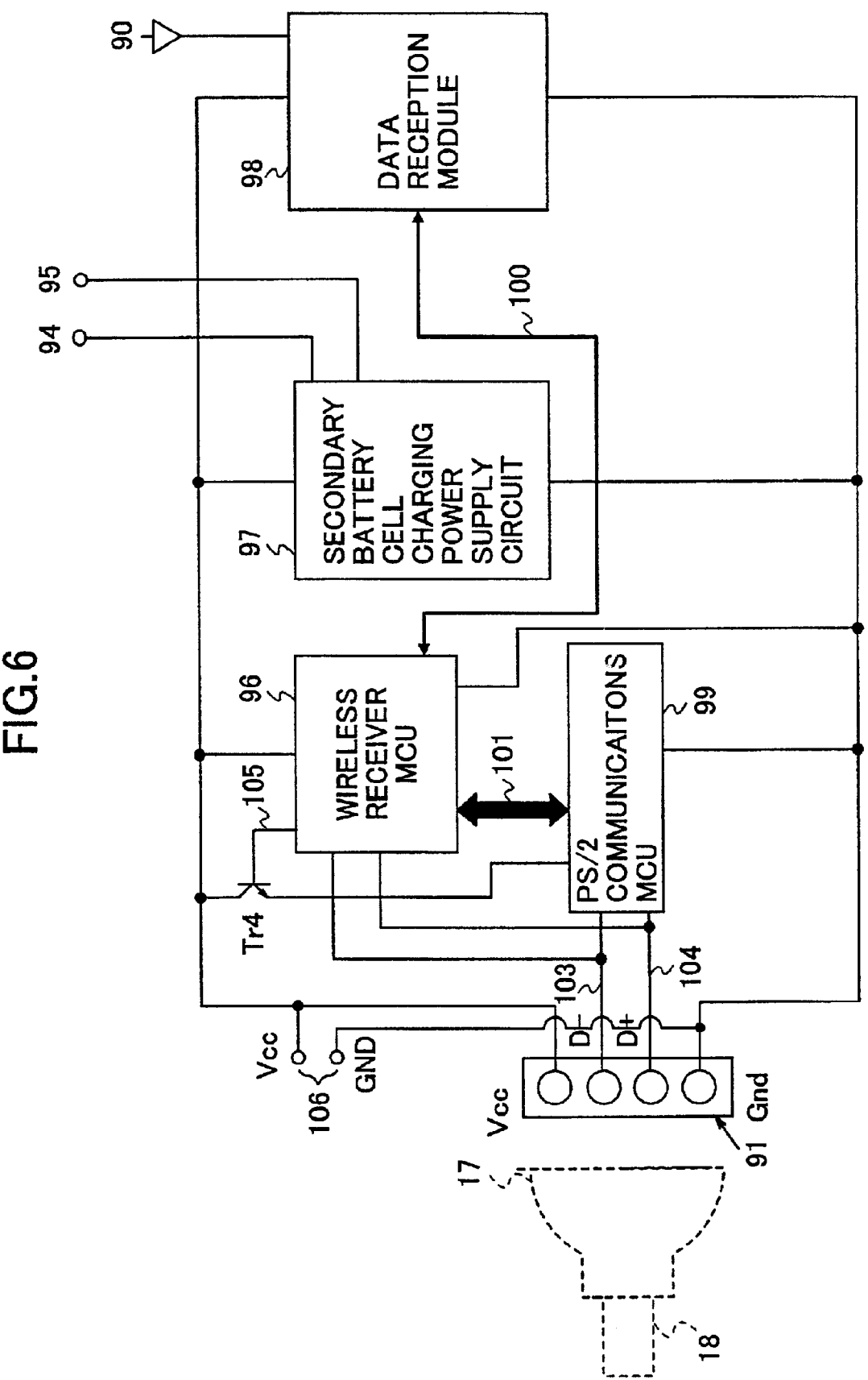
FIG. 6 is a block diagram of the receiver shown in FIG. 5.

FIG. 6 is a block diagram of the receiver shown in FIG. 5.

As shown in FIG. 6, the printed circuit board module 92 has a wireless mouse microcontroller unit 96, a secondary battery cell charging power supply circuit 97, a data reception module 97 and a PS/2 communications microcontroller unit 99.

The data reception module 98 and the wireless mouse microcontroller unit 96 are connected by a bus 100. The wireless mouse microcontroller unit 96, the secondary battery cell charging power supply circuit 97 and the data reception module 98 are connected in parallel, and are operated when supplied with a supply voltage Vcc.

The data reception module 98 processes the radio signals received from the wireless mouse at the reception antenna 90 and transmits the processed signals to the wireless mouse microcontroller unit 96.

The wireless mouse microcontroller unit 96 takes the signals from the data reception module 98, processes them into USB mode signals and outputs the processed USB mode signals to data lines 103, 104. Additionally, the microcontroller unit 96 detects that the interface is a PS/2 and, in such a case, outputs the signals to the line 105, turning transistor Tr4 ON and feeding the supply voltage Vcc to the PS/2 communications microcontroller unit 99.

The secondary battery cell charging power supply circuit 97 outputs a voltage of 4.4 V to the terminals 94, 95.

The PS/2 communications microcontroller unit 99 is connected by a bus 101 to the microcontroller unit 96. When the interface is a PS/2, the PS/2 communications microcontroller unit 99 converts data from the wireless mouse microcontroller unit 96 into PS/2 interface signals and outputs these to data lines 103, 104.

It should be noted that when the wireless mouse microcontroller unit 96, like the microcontroller unit 73 shown in FIG. 4, is configured so as to automatically switch from a USB operating state to a PS/2 operating state when a PS/2 interface is detected, then the PS/2 communications microcontroller unit 99 is not needed.

FIG. 7 shows a connector cable 18. The connector cable 18 has a USB male connector 16 at one end and a connector 17 at the other end.

A description will now be given of a state of use of the above-described wireless mouse unit 10, in the first instance in a case in which the wireless mouse 14 is used as a wireless mouse.

As an initial matter, it should be noted that the rear of the computer main unit is provided with a USB female connector. The USB male connector 16 of the connector cable 18 is connected to the USB female connector on the back of the computer main unit 11, so that the connector cable 18 extends from the computer main unit 11. The connector 17 of the connector cable 18 is connected to the female connector 91 of the receiver 15. The receiver 15 operates using the supply voltage Vcc from the computer main unit 11 supplied via the connector cable 18.

The wireless mouse 14 operates using the output voltage of the secondary battery cell 50. As shown in FIG. 4, the output voltage of the secondary battery cell 50 is boosted by the booster circuit 77 and supplied to the LED 61 and the optical sensor chip 62, the LED 61 emits light and the optical sensor unit 36 operates. Additionally, the output voltage of the secondary battery cell 50 is supplied to the wireless mouse microcontroller unit 70 and the data transmission module 71 to operate these units.

Operating the wireless mouse 14 causes radio signals 19 to be transmitted, these radio signals 19 are received at the receiving antenna 90, the data reception module 98 processes the radio signals sent from the wireless mouse 14 and received at the reception antenna 90, and the processed signals are sent to the wireless mouse microcontroller unit 96. The wireless mouse microcontroller unit 96 processes the signals from the data reception module 98 into USB interface signals and outputs the processed signals to the data lines 103, 104, where the signals are sent to the computer 11 via the connector cable 18 and the cursor 21 is moved across the CRT display monitor 12.

The solar battery cell 66 receives that part 65b of the light emitted from the LED 61 that travels upward either directly or at an angle and outputs electric power. This electric power complements the power that drives the optical sensor unit 36, wireless mouse microcontroller unit 70 and data transmission module 71, so that the solar battery cell 66 functions as an auxiliary power source. Additionally, the output voltage of the solar battery cell 66 is also used to recharge the secondary battery cell 50.

A description will now be given of a state in which the wireless mouse 14 is not in use.

Figure 8:
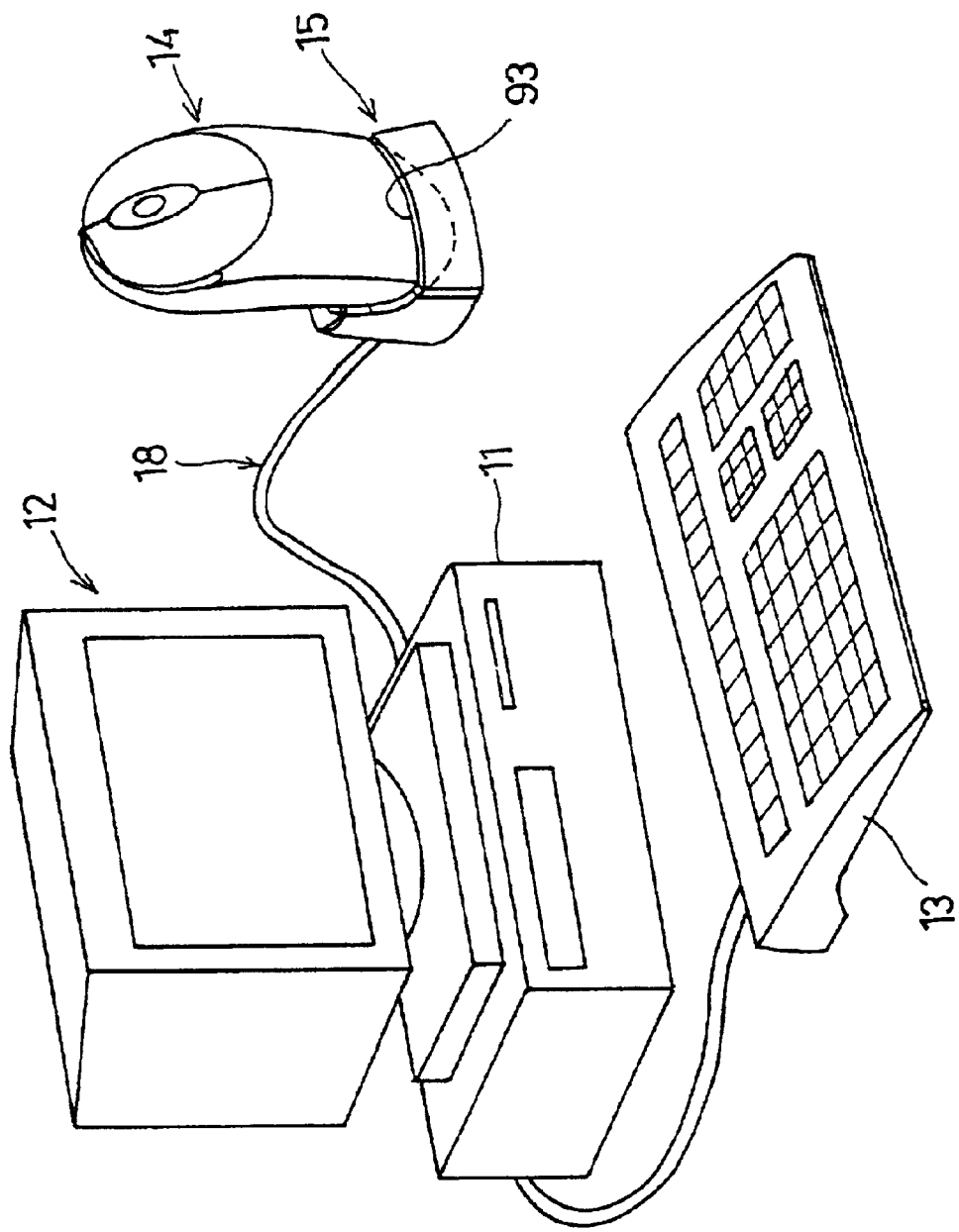
FIG. 8 is a diagram illustrating a state in which the wireless mouse is not in use.

FIG. 8 is a diagram illustrating a state in which the wireless mouse is not in use.

As shown in FIG. 8, the wireless mouse 14 is stored upright inside the concave wireless mouse holder 93 on the receiver 15. The wireless mouse 14 is supported in that upright state so as not to tip over, and further, the charging terminals 37, 38 contact the corresponding charging terminals 94, 95 on the receiver 15.

A voltage of 4.4 V flows to the stored wireless mouse 14 from the charging terminals 94, 95 on the receiver 15 via the charging terminals 37, 38, by which the secondary battery cell 50 is recharged. As a result, when not in use, the secondary battery cell 50 voltage expended during usage of the wireless mouse 14 is recovered.

As shown in FIG. 4, the operation of charging the secondary battery cell 50 is conducted under the control of a secondary battery cell charger controller 74, using power supplied from the secondary battery cell charging power supply circuit 97 built into the receiver 15 and supplied with power from the computer main unit 11 via the connector cable 18. In other words, charging continues until the secondary battery cell 50 is fully charged, at which point the a signal from the secondary battery cell charger controller 74 opens the overcharge prevention switch circuit 75, turning the charge circuit 76 OFF and terminating charging of the secondary battery cell 50. As a result, the secondary battery cell 50 does not experience needless generation of heat.

As can be appreciated by those skilled in the art, the secondary battery cell 50 continues to be charged by the power supplied from the AC adapter 107 even after the operator cuts off power to the computer main unit 11.

A description will now be given of the wireless mouse 14 used as a wired mouse, with reference to FIG. 9.

Figure 9:
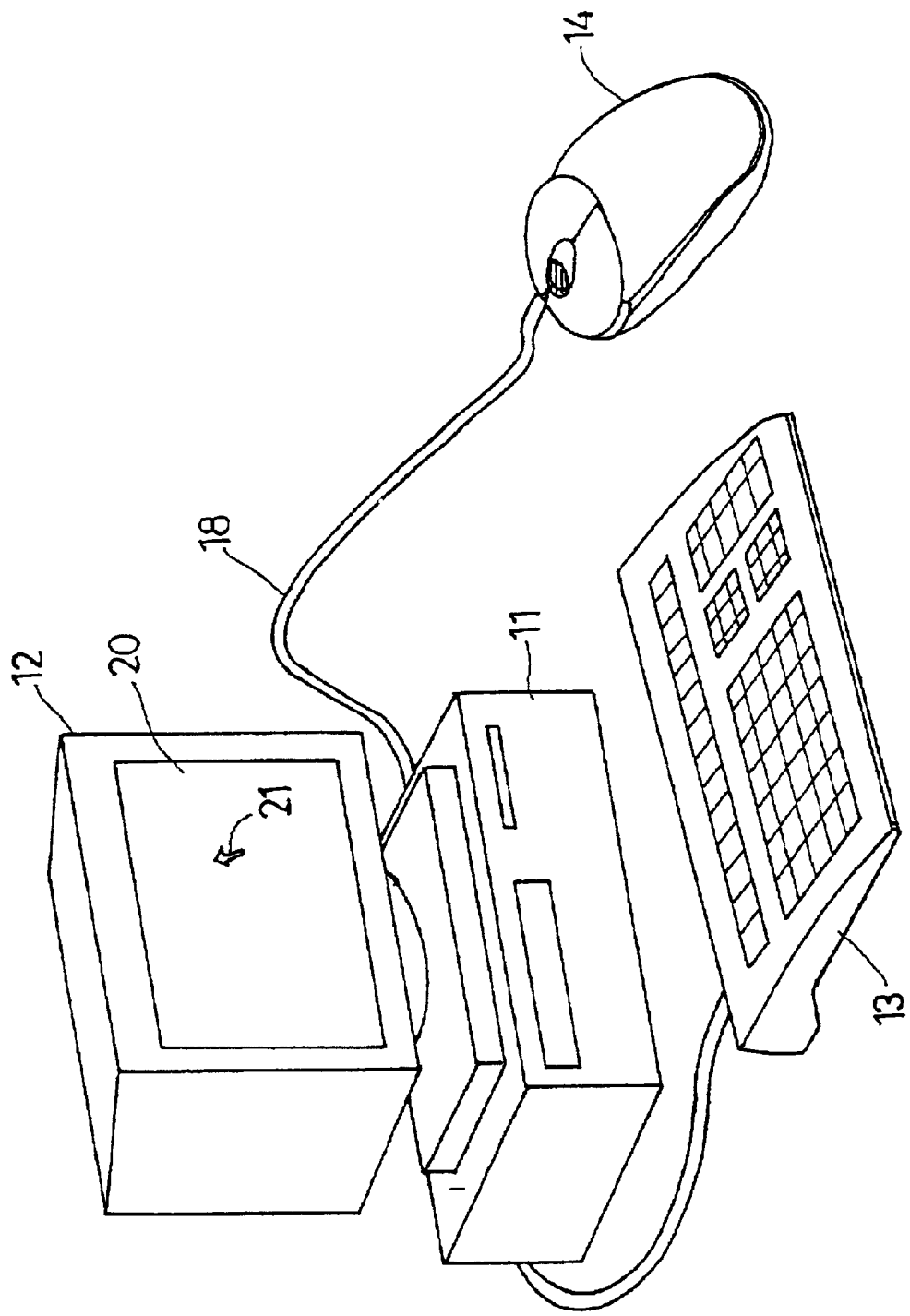
FIG. 9 is a diagram showing a state in which the wireless mouse is used as a wired mouse.

FIG. 9 is a diagram showing a state in which the wireless mouse is used as a wired mouse.

Typically, the wireless mouse 14 is used as a wired mouse as an emergency measure, when the operator forgets to charge the secondary battery cell 50 in the wireless mouse 14 and only discovers this fact when an attempt is made to use the wireless mouse 14 as a wireless mouse and the wireless mouse 14 does not respond. The ability to use the wireless mouse as a wired mouse is thus a sort of insurance, that is, when the voltage on the secondary battery cell 50 is low and the wireless mouse 14 cannot be used in that capacity it can nevertheless still be used as a mouse.

The connector 17 of the connector cable 18 is unplugged from the female connector 91 of the receiver 15 and connected to the connector 34 of the wireless mouse 14. The wireless mouse 14 is supplied with supply voltage Vcc by the computer main unit 11 via the connector cable 18 and then via the connector 34.

As shown in FIG. 4, the application of the supply voltage Vcc to the USB microcontroller unit 73 activates the USB microcontroller unit 73, outputting a signal to the lines 83, 84. The output of a signal to the lines 83, 84 turns the transistors Tr1 and Tr2 ON.

When transistor Tr1 turns ON, the supply voltage Vcc passes through Tr1 and line 82, bypasses the booster circuit 77 and is fed to the LED 61 and the optical sensor chip 62. The output from the optical sensor chip 62 turns the transistor Tr3 ON, the LED 61 emits light and the optical sensor unit 36 is activated. Accordingly, moving the wireless mouse 14 supplies a signal from the optical sensor unit 36 to the USB microcontroller unit 73, where the signal is processed and transmitted to the data lines 80, 81, and, further, are supplied to the computer main unit 11 via the connector cable 18, moving the cursor throughout the display screen 20.

When the transistor Tr2 turns ON, the supply voltage Vcc is fed to the secondary battery cell charger controller 74, the wireless mouse microcontroller unit 70 and the data transmission module 71.

When the operator lets go of the wireless mouse 14, the wireless mouse 14 remains stationary atop the working surface and changes in the flow of data from the wireless mouse 14 to the computer main unit 11 cease. In such a situation, in which there is no change in the data sent from the optical sensor unit 36 and in the output from the operation of the buttons 31, 32, 33, then a command from the secondary battery cell charger controller 74 commences charging of the secondary battery cell 50 using the supply voltage Vcc. Charging continues until the secondary battery cell 50 is fully charged.

Accordingly, the secondary battery cell is charged while the wireless mouse 14 is being used as a wired mouse, allowing the wireless mouse 14 to be used once again as a wireless mouse.

Next, a description will be given of a case in which the computer main unit is not equipped with a USB female connector.

Figure 10:
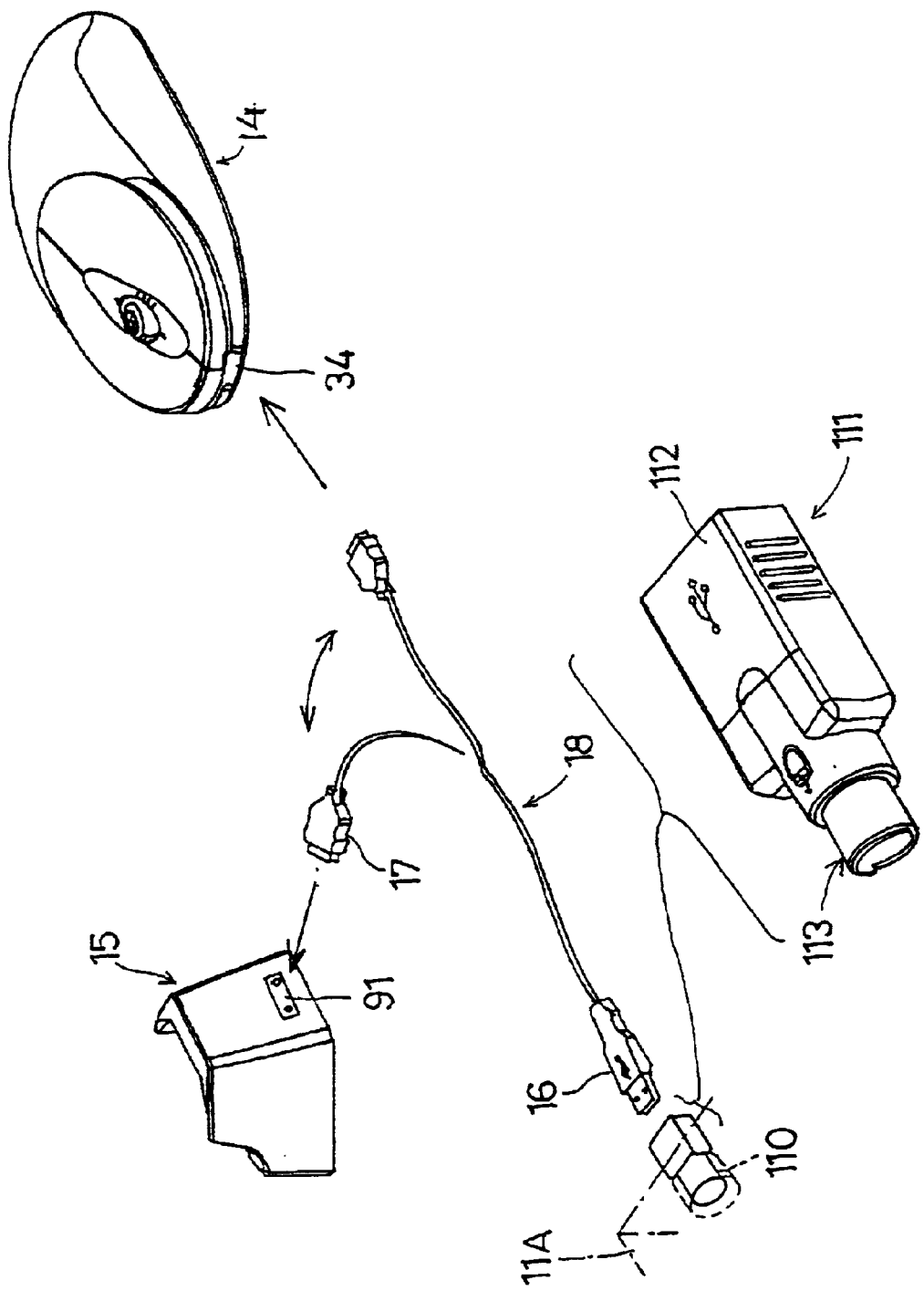
FIG. 10 is a diagram showing a state of usage of the wireless mouse in a case in which the computer main unit is not equipped with a USB female connector.

FIG. 10 is a diagram showing a state of usage of the wireless mouse in a case in which the computer main unit is not equipped with a USB female connector.

As shown in the diagram, a PS/2 female connector 110 is provided on a rear of a computer main unit 11A.

In this case, a USB-PS/2 converter connector 111 is used. The USB-PS/2 converter connector 111, shown in an expanded view in FIG. 10, has a USB female connector 112 at one end and a PS/2 male connector 113 at the other end. The USB female connector 112 and the PS/2 male connector 113 are joined back-to-back, with an arrangement of pins being changed.

The PS/2 male connector 113 of the USB-PS/2 converter connector 111 is inserted into and connected to the PS/2 female connector 110 of the computer main unit 11A.

The USB male connector 16 of the connector cable 18 is connected to the USB female connector 112 of the USB-PS/2 converter connector 111 and the connector cable 18 is extended from the computer main unit 11A. The connector 17 of the connector cable 18 is connected to the female connector 91 of the receiver.

The PS/2 communications microcontroller unit 99 operates inside the receiver 15 shown in FIG. 6.

Moving the wireless mouse 14 causes a radio signal 19 transmitted from the transmission antenna 78 to be received at the reception antenna 90 of the receiver 15, processed by the data reception module 98, and then converted into PS/2 communications data by the PS/2 communications microcontroller unit 99. This processed data is then output to data lines 103, 104 and sent to the computer main unit 11 via the connector cable 18, causing the cursor 12 to move about the display screen 20 of the CRT monitor 12.

The wireless mouse 14 is at this time used as a wireless mouse, as shown in FIG. 1.

After the operator is finished using the wireless mouse 14, the operator sets or places the wireless mouse in the receiver 15 and the secondary battery cell 50 is charged.

In the event that the wireless mouse cannot be used because the secondary battery cell 50 has not been adequately charged, the connector 17 is unplugged from the receiver 15 and is then connected to the connector 34 of the wireless mouse 14.

At this time, the USB microcontroller unit 73 shown in FIG. 4 detects that the interface is a PS/2 interface and automatically switches from a USB operating state to a PS/2 operating state. As a result, PS/2 interface signals are transmitted from the wireless mouse 14, and these are sent via the connector cable 18 to the computer main unit 11, causing the cursor 12 to move about the display screen 20 of the CRT monitor 12.

As a result, the wireless mouse 14 is used in a wired state, as shown in FIG. 9.

Figure 11:
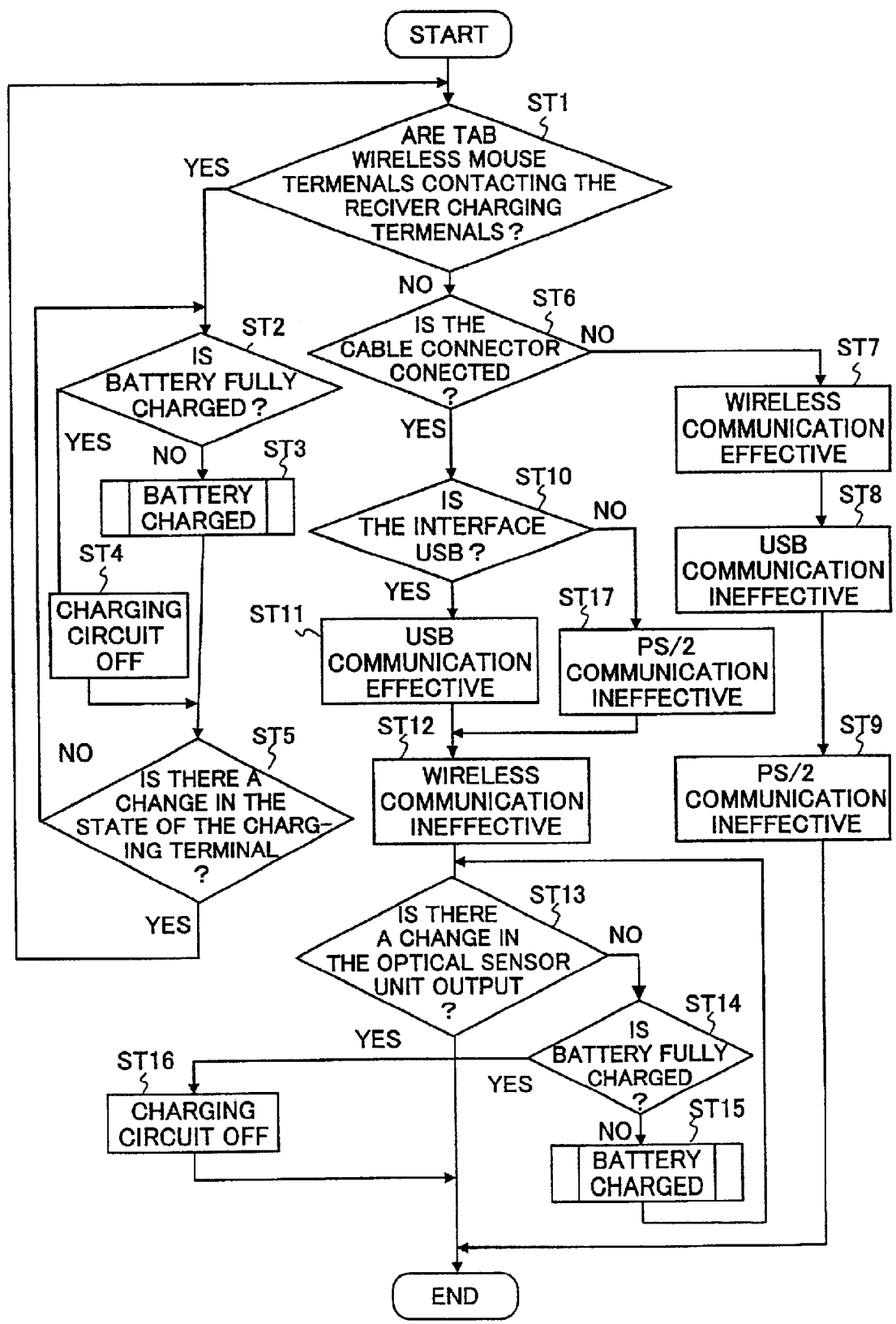
FIG. 11 is a flow chart of operations relating to usage of the wireless mouse unit 10 and the charging of the secondary battery cell 50 by the wireless mouse microcontroller unit 70, the USB microcontroller unit 73 and the secondary battery cell charger controller 74 of FIG. 4.

FIG. 11 is a flow chart of operations relating to usage of the wireless mouse unit 10 and the charging of the secondary battery cell 50 by the wireless mouse microcontroller unit 70, the USB microcontroller unit 73 and the secondary battery cell charger controller 74 of FIG. 4.

Initially, in a step ST1, it is ascertained whether or not the wireless mouse terminals 37, 38 are in contact with the receiver charging terminals 94, 95. If the answer to this question is YES, then in a step ST2 it is ascertained whether or not the secondary battery cell 50 is fully charged and, if not, then in a step ST3 the battery is charged. Next, in a step ST5, it is ascertained whether or not there is a change in the state of the charging terminals 94, 95, and if not, then the process returns to step ST2. If the answer to the question posed in step ST2 is NO, then the overcharge prevention switch circuit 75 is opened and the charging circuit is turned OFF. If the answer to the question posed in step ST5 is YES, then the process returns to step ST1.

If the answer to the question posed in step ST1 is NO, then in a step ST6 it is ascertained whether or not the connector 17 of the connector cable 18 is connected to the connector 34, and if not, then the apparatus is put into a wireless communication mode in a step ST7. In a step ST8 USB communication is rendered ineffective and in a step ST9 PS/2 communication is rendered ineffective.

If it is ascertained in step ST6 that the cable connector is not connected, then the apparatus is put into a wireless communication mode in a step ST7. In a step ST8 USB communication is rendered ineffective and in a step ST9 PS/2 communication is rendered ineffective.

If it is ascertained in step ST6 that the cable connector is connected, then in a step ST10 it is ascertained whether or not the interface is USB. If so, then in a step ST11 USB communication is rendered effective and in a step ST12 wireless communication is rendered ineffective. If not, then in a step ST17 the PS/2 communication is rendered effective and wireless communication is rendered ineffective in a step S12.

Next, in a step ST13, it is ascertained whether or not there is a change in the mouse data, that is, either from the optical sensor unit 36 or in operation of the mouse buttons 31, 32, 33. If not, then in a step ST14 it is ascertained whether or not the secondary battery cell 50 is fully charged. If the secondary battery cell 50 is not fully charged, then in a step ST15 the secondary battery cell 50 is charged. If the secondary battery cell 50 is fully charged, then in a step ST16 the overcharge prevention switch circuit 75 is opened and the charging circuit 76 is turned OFF.

A description will now be given of another embodiment of the wireless mouse according to the present invention, with reference to FIGS. 12, 13 and 14.

Figure 12:
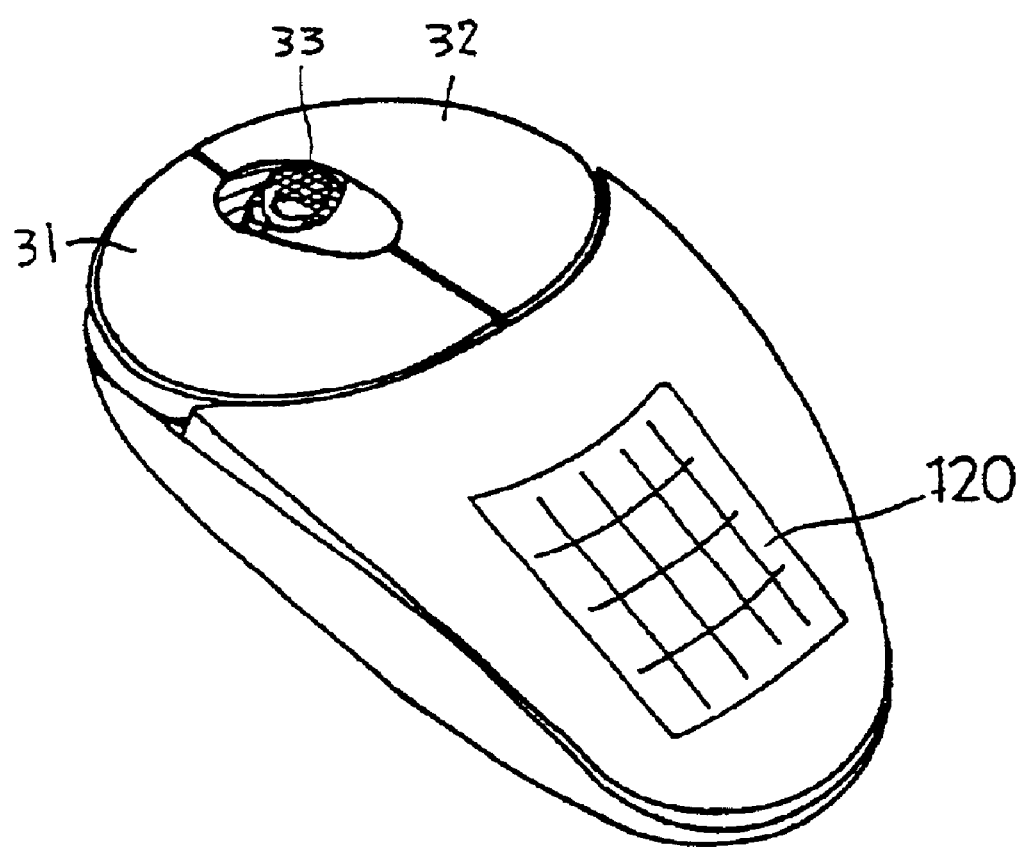
FIG. 12 is a diagram showing another embodiment of the wireless mouse according to the present invention.

FIG. 12 is a diagram showing another embodiment of the wireless mouse 14A according to the present invention. FIG. 13 is a circuit diagram of the wireless mouse shown in FIG. 12.

As can be understood from the diagram, the wireless mouse 14A differs from the wireless mouse 14 shown in FIGS. 2A and 2B insofar as a solar battery cell 120 is provided on an upper surface of the body 30. The wireless mouse 14A, like the wireless mouse 14 depicted in FIGS. 2A and 2B, is used as a wireless mouse, and when not in use is stored in the receiver 15. Additionally, the wireless mouse 14A is used as a wired mouse when the secondary battery cell 50 is drained and its voltage is low.

Although the solar battery cell 120 is covered by the palm of the operator's hand when the wireless mouse 14A is in use, when usage of the wireless mouse 14A is interrupted and the wireless mouse 14A is left atop the working surface, or when the wireless mouse 14A is set in the receiver 15, the solar battery cell 120 is exposed so as to receive light from an external source and generate power. This solar battery cell 120, as shown in FIG. 13, is connected in parallel with the secondary battery cell 50, and the electricity generated by the solar battery 120 is used to charge the secondary battery cell 50.

Figure 13:
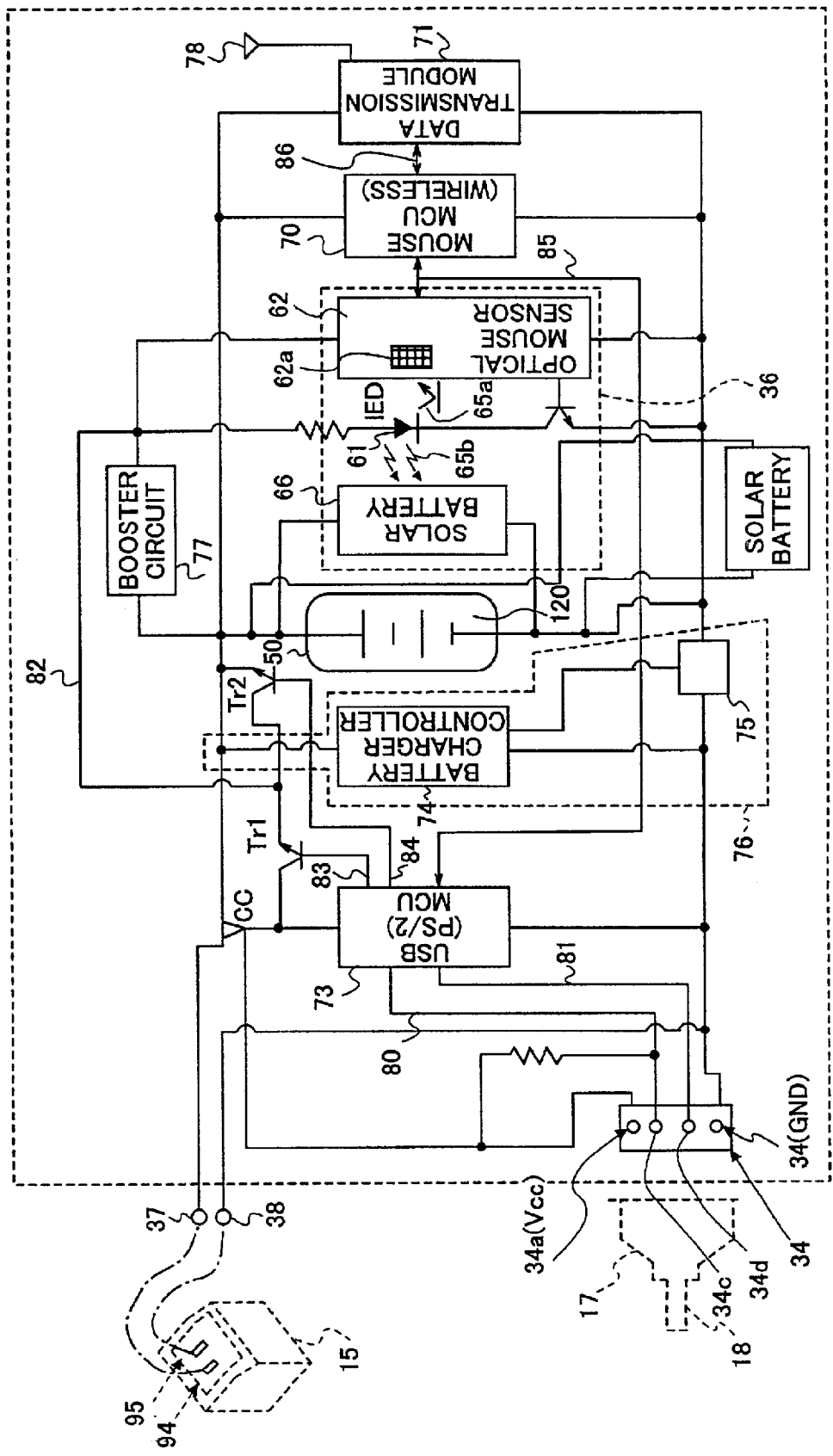
FIG. 13 is a circuit diagram of the wireless mouse shown in FIG. 12.
Figure 14:
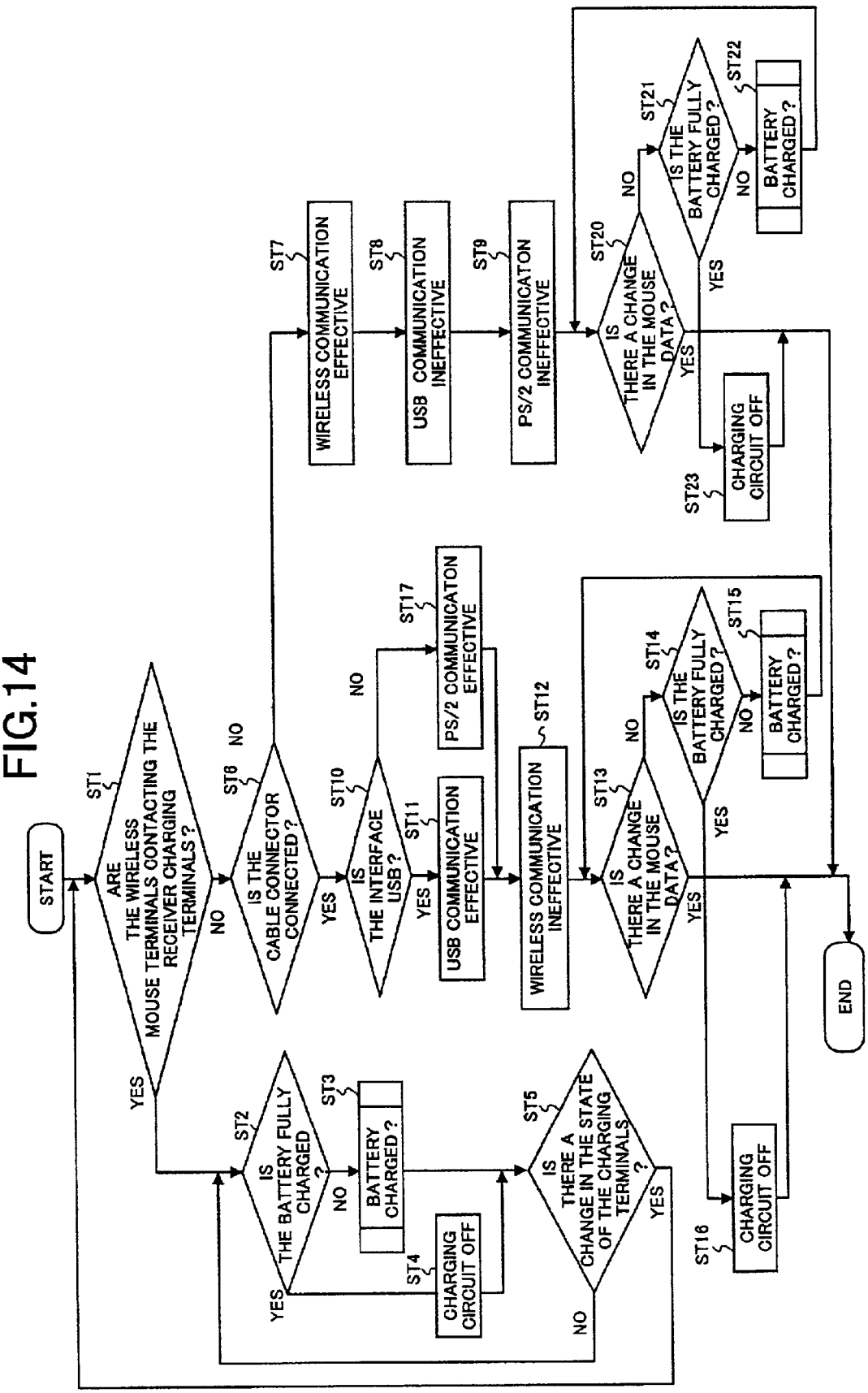
FIG. 14 is a flow chart showing steps in a process of charging the battery by the wireless mouse microcontroller unit 70, the USB microcontroller unit 73 and the secondary battery cell charger controller 74 shown in FIG. 12.

FIG. 14 is a flow chart showing steps in a process of charging the battery by the wireless mouse microcontroller unit 70, the USB microcontroller unit 73 and the secondary battery cell charger controller 74 shown in FIG. 13.

The flow chart depicted in FIG. 14 adds steps ST20–ST23 to the flow chart depicted in FIG. 11. Following step ST9 as described above, it is ascertained in a step ST20 whether or not there is a change in the mouse data, that is, either from the optical sensor unit 36 or in operation of the mouse buttons 31, 32, 33. If there is no change in the data output, then in a step ST21 it is ascertained whether or not the secondary battery cell 50 is fully charged. If not, then the battery is charged in a step ST22, and if so, then in step ST21 the overcharge prevention switch circuit 75 is closed, turning the charging circuit 76 OFF in a step ST23.

As noted previously, according to the embodiments of the invention as described above, the need for a dedicated separate charger for charging the wireless mouse secondary battery cell is eliminated. Additionally, after usage the wireless mouse can be set in the receiver portion of the wireless mouse unit and the secondary battery cell built into the wireless mouse can be charged in the meanwhile, so the wireless mouse can be readied for use with an adequate charge. Additionally, the wireless mouse can also be used in a wired state because the wireless mouse can be connected to the computer and powered by the computer, which is convenient in case the operator forgets to charge the secondary battery cell. Additionally, the wireless mouse secondary battery cell can be charged while the wireless mouse is being used as a wired mouse. Additionally, inclusion of a solar battery cell in the wireless mouse connected in parallel to the secondary battery cell of the wireless mouse allows the electricity generated by the solar battery cell to be used either to power the wireless mouse or to charge the secondary battery cell, thus reducing consumptive wear on the rechargeable secondary battery cell and extending its working life.

Moreover, as can be appreciated by those skilled in the art, it is possible to use infrared rays instead of radio waves as a means of wireless communication.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 2000-351459, filed on Nov. 17, 2000, the contents of which are hereby incorporated by reference.

What is claimed is:

1. A wireless mouse unit comprising:
   a wireless mouse to generate signals to move a cursor across a display screen;
   a rechargeable secondary battery cell included in the wireless mouse;
   a connector cable having at one end thereof a USB connector for connecting to a USB connector located on a computer and a second connector at another end thereof;
   a USB-PS/2 conversion connector having a USB connector at one end thereof and a PS/2 connector at another end thereof;
   a receiver to receive the signals transmitted from the wireless mouse,
   wherein the receiver further comprises a connector detachably electrically connected to and powered by a computer via cable and an AC terminal detachably electrically connected to and powered by an AC adapter, so that the receiver is configured to be chargeable by either one of the connector and the AC terminal;
   a receiver connector to connect to the second connector; and
   a USB microcontroller unit to output a PS/2 mode signal when the USB connector at one end of the connector cable is connected to the computer via the USB-PS/2 converter connector.

2. The wireless mouse unit as claimed in claim 1, wherein the receiver includes a wireless mouse cradle shaped to accommodate the wireless mouse when the wireless mouse is set thereat when the wireless mouse is not in use, the charging terminals disposed so as to contact charging terminals provided on the wireless mouse when the wireless mouse is set at the wireless mouse cradle so as to allow recharging of the rechargeable secondary battery cell.

3. The wireless mouse unit as claimed in claim 1, further comprising a connector cable having at one end thereof a USB connector for connecting to USB connector located on the computer and a second connector at another end thereof, wherein:
   the receiver further comprises a connector for connecting to the second connector of the connector cable;
   the wireless mouse further comprises:
      a wireless mouse connector for connecting to the second connector of the connector cable; and
      a USB microcontroller unit powered by power supplied from the computer via the wireless mouse connector; and
   a battery charger for recharging the rechargeable secondary battery cell of the wireless mouse using electric power supplied from the computer via the cable when the wireless mouse is not in use, the battery charger being powered by power supplied from the computer via the wireless mouse connector.

4. The wireless mouse unit as claimed in claim 1, wherein the wireless mouse further comprises:
   a wireless mouse connector for connecting to the second connector of the connector cable;
   a USB microcontroller unit powered by power supplied from the computer via the wireless mouse connector and that switches to PS/2 mode when the USB connector at one end of the connector cable is connected to the computer via the USB-PS/2 converter connector; and
   a battery charger for charging the rechargeable secondary battery cell of the wireless mouse using electric power supplied from the computer via the cable when the wireless mouse is not in use, the battery charger being powered by power supplied from the computer via the wireless mouse connector.

5. A wireless mouse that transmits wireless signals to a receiver connected to a computer so as to move a cursor through a display screen of the computer, the wireless mouse comprising:

a rechargeable secondary battery cell;

charging terminals that connect to charging terminals disposed on the receiver when the wireless mouse is set on the receiver, such that when so set the rechargeable secondary battery cell is charged using electric power supplied from the computer;

a connector terminal connecting to a connector at one end of a cable extending from the computer, the cable being connected to a USB female connector on the computer, to transmit signals to the computer so as to move the cursor through the display screen; and a USB microcontroller unit powered by electric power from the connector at the one end of the cable.

6. The wireless mouse as claimed in claim 5, wherein a solar battery cell is provided on an upper surface of a body of the wireless mouse, the solar battery cell being electrically connected in parallel with the rechargeable secondary battery cell.

7. The wireless mouse as claimed in claim 5, further comprising:

an optical sensor unit having a light emitting element and an optical sensor chip for sensing light emitted from the light emitting element and reflected from a working surface on which the wireless mouse is set during operation; and a built-in solar battery cell that captures a portion of the light emitted from the light emitting element, the solar battery cell and the rechargeable secondary battery cell being electrically connected in parallel.

8. The wireless mouse as claimed in claim 5, that transmits wireless signals to the receiver connected to a computer so as to move a cursor, through a display screen of the computer, the wireless mouse further comprising the rechargeable secondary battery cell such that power from the computer is used to charge the rechargeable secondary battery cell when the wireless mouse is connected to the connector at one end of the cable, with the rechargeable secondary battery not being used to power the wireless mouse.

9. A receiver and wireless mouse connected to a computer, with the receiver receiving wireless signals transmitted from the wireless mouse so as to move a cursor through a display screen of the computer, comprising:

a wireless mouse cradle shaped to accommodate the wireless mouse when the wireless mouse is set thereat when the wireless mouse is not in use;

charging terminals disposed so as to contact charging terminals provided on the wireless mouse when the wireless mouse is set at the wireless mouse cradle so as to allow charging of a rechargeable secondary battery cell;

a power connector to provide power to the receiver in addition to power available from a detachable connector connected to the computer:

an optical sensor unit having a light emitting element and an optical sensor chip for sensing light emitted from a light emitting element and reflected from a working surface on which the wireless mouse is set during operation; and a built-in solar battery cell that captures a portion of the light emitted from the light emitting element, wherein the rechargeable secondary battery cell is configured to be charged by the solar batter cell.

10. The receiver and wireless mouse as claimed in claim 9, wherein the detachable connector connected to a connector at an end of a cable extending from the computer and connected to a USB connector of the computer.

* * * * *

UNITED STATES PATENT AND TRADEMARK OFFICE
CERTIFICATE OF CORRECTION

PATENT NO. : 6,801,967 B2
DATED : October 5, 2004
INVENTOR(S) : Shuji Nakamura et al.

It is certified that error appears in the above-identified patent and that said Letters Patent is hereby corrected as shown below:

Column 3,
Line 38, insert -- a -- after "to";

Column 5,
Line 34, change "batter" to -- battery --.

Signed and Sealed this

Ninth Day of August, 2005

JON W. DUDAS
*Director of the United States Patent and Trademark Office*